(12) United States Patent
Logue et al.

(10) Patent No.: US 10,549,286 B2
(45) Date of Patent: Feb. 4, 2020

(54) APPARATUS FOR PRODUCING MOLYBDENUM DISULFIDE POWDERS

(71) Applicant: Climax Molybdenum Company, Phoenix, AZ (US)

(72) Inventors: Gregory Rue Logue, Fort Madison, IA (US); Larry Giannotti, Fort Madison, IA (US); Gary G. de Gala, Fort Madison, IA (US); James A. Cole, Fort Madison, IA (US); David L. Cottrell, Fort Madison, IA (US)

(73) Assignee: Climax Molybdenum Company, Phoenix, AZ (US)

(*) Notice: Subject to any disclaimer, the term of this patent is extended or adjusted under 35 U.S.C. 154(b) by 1516 days.

(21) Appl. No.: 14/314,838

(22) Filed: Jun. 25, 2014

(65) Prior Publication Data

US 2014/0306043 A1 Oct. 16, 2014

Related U.S. Application Data

(62) Division of application No. 13/365,697, filed on Feb. 3, 2012, now Pat. No. 8,808,661.
(Continued)

(51) Int. Cl.
*B02C 19/00* (2006.01)
*B02C 19/06* (2006.01)
(Continued)

(52) U.S. Cl.
CPC ............ *B02C 19/06* (2013.01); *B02C 19/068* (2013.01); *B02C 23/02* (2013.01); *C01G 39/06* (2013.01);
(Continued)

(58) Field of Classification Search
CPC ........ B02C 19/06; B02C 19/068; B02C 23/02
(Continued)

(56) References Cited

U.S. PATENT DOCUMENTS 2,892,741 A 6/1959 Spengler et al.
2,983,453 A * 5/1961 Drew .................... B02C 19/06
241/1

(Continued)

FOREIGN PATENT DOCUMENTS

JP S61-027104 B1 6/1986
JP H06-064909 A 3/1994
(Continued)

OTHER PUBLICATIONS

Japanese Office Action dated Mar. 25, 2016, for Japanese Patent Application No. 2014-202953, and English translation, 6 pages.
(Continued)

*Primary Examiner* — Faye Francis
(74) *Attorney, Agent, or Firm* — Fennemore Craig, P.C.

(57) ABSTRACT

Apparatus for reducing a particle size of a precursor powder material by fluid energy impact according to one embodiment of the invention may include a housing defining an interior milling cavity therein having a peripheral wall. A powder feed inlet operatively associated with the housing introduces the precursor powder material into the interior milling cavity. A feed gas inlet operatively associated with the powder feed inlet introduces a feed gas into the interior milling cavity. A product discharge outlet operatively associated with the housing removes a milled powder product from the interior milling cavity. An oil injection nozzle assembly operatively associated with the product discharge outlet injects oil into a particle-laden product stream from the product discharge outlet.

8 Claims, 4 Drawing Sheets

Related U.S. Application Data

(60) Provisional application No. 61/439,571, filed on Feb. 4, 2011.

(51) Int. Cl.
*C01G 39/06* (2006.01)
*B02C 23/02* (2006.01)

(52) U.S. Cl.
CPC ...... *C01P 2004/61* (2013.01); *C01P 2004/62* (2013.01); *C01P 2006/19* (2013.01); *Y10T 428/2982* (2015.01)

(58) Field of Classification Search
USPC .......................................... 241/1, 5, 39, 301
See application file for complete search history.

(56) References Cited

U.S. PATENT DOCUMENTS

| | | | |
|---|---|---|---|
| 3,062,741 | A | 11/1962 | Crowl |
| 3,073,779 | A | 1/1963 | Wheeler |
| 3,082,065 | A | 3/1963 | Wheeler |
| 3,156,420 | A | 11/1964 | Crowl |
| 3,661,508 | A | 5/1972 | Ritsko |
| 3,842,009 | A | 10/1974 | Barry et al. |
| 4,243,554 | A | 1/1981 | Naummann et al. |
| 4,284,244 | A | 8/1981 | Hoover et al. |
| 4,606,817 | A | 8/1986 | Malhotra et al. |
| 4,792,098 | A * | 12/1988 | Haddow ............... B02C 19/066 241/152.1 |
| 4,832,268 | A * | 5/1989 | Haddow ............... B02C 19/065 241/152.1 |
| 5,421,524 | A * | 6/1995 | Haddow ................. B02C 19/06 241/18 |
| 5,512,406 | A | 4/1996 | Takeda et al. |
| 8,507,090 | B2 | 8/2013 | Shaw et al. |
| 2003/0094810 | A1 | 5/2003 | Goto et al. |
| 2004/0118007 | A1 | 6/2004 | Chickering, III et al. |
| 2006/0086205 | A1 | 4/2006 | Johnson, Jr. et al. |
| 2007/0040056 | A1 | 2/2007 | Weidhaus |
| 2008/0054106 | A1 | 3/2008 | Zehavi et al. |
| 2010/0248119 | A1 | 9/2010 | Young et al. |

FOREIGN PATENT DOCUMENTS

| | | |
|---|---|---|
| JP | H10-118479 A | 5/1998 |
| JP | 2004207578 A | 7/2004 |
| JP | 2006-509627 A | 3/2006 |
| WO | 2010043968 A2 | 4/2010 |

OTHER PUBLICATIONS

European Search Report, dated Dec. 11,2014, for corresponding European Patent Application No. 14178636.8, filed Feb. 3, 2012, 3 pages.

European Search Report, dated Dec. 11,2014, for corresponding European Patent Application No. 14178637.6, filed Feb. 3, 2012, 3 pages.

Epshteyn, Yakov, et al., "Molybdenum Disulfide in Lubricant Applications—A Review," Climax Molybdenum—A Freeport-McMoRan Company, Phoenix, AZ; Presented at the 12 Lubricating Grease Conference, NLGI—India Chapter, Hotel Cedade de Goa, Goa, India, Jan. 28-30, 2010, pp. 1-12.

International Search Report and Written Opinion dated Jul. 20, 2012 for PCT Application No. PCT/US2012/023757, 10 pages.

* cited by examiner

APPARATUS FOR PRODUCING MOLYBDENUM DISULFIDE POWDERS

CROSS-REFERENCE TO RELATED APPLICATION

This application is a divisional of U.S. patent application Ser. No. 13/365,697, filed on Feb. 3, 2012, now U.S. Pat. No. 8,808,661, which claims the benefit of U.S. provisional patent application Ser. No. 61/439,571, filed on Feb. 4, 2011, both of which are hereby incorporated herein by reference for all that they disclose.

TECHNICAL FIELD

The present invention generally relates to the processing of molybdenum and more particularly to the production of molybdenum disulfide powders.

BACKGROUND

Molybdenum disulfide ($MoS_2$) is usually recovered from molybdenite ore obtained from a variety of mine sites, including "primary" and "secondary" mine sites. Broadly speaking, molybdenite ore consists of silicified granite compositions having deposits of soft, black, and hexagonal $MoS_2$ crystalline structures widely dispersed therein (e.g., in an average concentration of only about 0.03-0.6% by weight of the entire ore body). One of the largest sources of $MoS_2$-containing ore (e.g., molybdenite) is the Henderson molybdenum mine near Empire, Colo. (US), currently operated by the Climax Molybdenum Company, although other mine sites throughout the world are able to produce large amounts of this material as well. The Henderson mine site is characterized as a primary mine and is capable of producing large amounts of molybdenite ore.

Molybdenum disulfide also may be recovered from secondary or by-product molybdenite obtained from secondary mine sites. For example, secondary molybdenite may be obtained from copper mines, wherein the secondary molybdenite is typically combined with copper-containing materials. In such cases, molybdenum disulfide concentrate is obtained as a by-product from copper sulfide-molybdenum disulfide separation processes.

In a typical processing operation, the molybdenite ore is initially subjected to a physical grinding process in which the ore is reduced in size to a plurality of small particles (e.g., having a typical particle size of about 100 U.S. mesh or less). The ore particles are then further treated to remove the desired $MoS_2$ therefrom. This treatment step may be accomplished using a variety of techniques, including froth flotation extraction procedures that employ various hydrocarbon compositions and wetting agents known in the art for this purpose. As a result, the desired $MoS_2$ may be effectively separated from ore-based waste materials (i.e., "gangue"), such as silica, silicates, clays, and other unwanted materials. The desired $MoS_2$ compositions will, by virtue of their minimal weight and density levels compared with the gangue, be readily isolated in the flotation froth.

The resulting molybdenum disulfide concentrate (i.e., from either primary or non-primary sources, as noted above) may be dried and sized (e.g., by grinding and subsequent classification steps) to produce a molybdenum disulfide powder product having the desired grade and particle size. Exemplary grades of molybdenum disulfide include "technical," "technical fine," and "superfine" grades, although other grades are known and commercially available. Technical grades of molybdenum disulfide typically comprise about 98% (by weight) molybdenum disulfide, with the balance comprising various amounts of iron, molybdenum trioxide, water, oil, and carbon, depending on a variety of factors.

The particle sizes of the molybdenum disulfide powder product may also vary within a specified grade. For example, technical grade molybdenum disulfide powders may have median particle sizes in the range of about 15-20 μm, with a small percentage of particles being as large as 200 μm or so. Technical fine grades may have median particle sizes in the range of about 4-6 μm, whereas superfine grades may comprise median particle sizes in the range of about 0.9 to about 1.6 μm.

Molybdenum disulfide powder products may also be characterized by an "acid number" and by an "oil number." The acid number of molybdenum disulfide typically refers to the amount or quantity of a base, such as potassium hydroxide (KOH), required to neutralize the acid in a defined quantity of molybdenum disulfide. The acid number is typically expressed as an absolute value and is the number of milligrams (mg) of potassium hydroxide (KOH) required to neutralize the acid in a 1-gram sample of molybdenum disulfide.

The acid number of a molybdenum disulfide product may vary from producer-to-producer and also tends to vary with particle size within a given grade. Generally speaking, the acid number increases with decreasing particle size. Thus, a plain technical grade molybdenum disulfide will typically have the lowest acid number, with the technical fine and superfine grades having progressively higher acid numbers.

The oil number is a measure of the residual oils contained in the molybdenum disulfide powder product. The residual oils may originate from a variety of sources, including the various froth flotation steps used during ore beneficiation, as well as from oils added to the molybdenum disulfide during various grinding or milling processes required to reduce the molybdenum disulfide powder product to the desired particle size. The oil number is typically expressed as a weight percentage of oil contained in the molybdenum disulfide powder product.

Depending on the ultimate application or use of the molybdenum disulfide powder product, it may be desirable or advantageous to reduce the acid number and/or oil number as much as possible. While various processes are known and may be used to reduce the acid and/or oil numbers, such processes typically involve additional processing steps, thus additional time and processing expense, before the molybdenum disulfide product will have the desired acid and/or oil numbers. Consequently, methods continue to be sought that will provide for the effective control of the acid and/or oil numbers in the molybdenum disulfide product while minimizing the need for additional time or process steps to achieve the desired product specifications.

SUMMARY OF THE INVENTION

Apparatus for reducing a particle size of a precursor powder material by fluid energy impact according to one embodiment of the invention may include a housing defining an interior milling cavity therein having a peripheral wall. A powder feed inlet operatively associated with the housing introduces the precursor powder material into the interior milling cavity. A feed gas inlet operatively associated with the powder feed inlet introduces a feed gas into the interior milling cavity. A product discharge outlet operatively associated with the housing removes a milled powder product from the interior milling cavity. An oil injection nozzle assembly operatively associated with the product discharge outlet injects oil into a particle-laden product stream from the product discharge outlet.

Another embodiment of apparatus for reducing a particle size of a precursor powder material by fluid energy impact may include a housing defining an interior milling cavity therein having a peripheral wall. A powder feed inlet operatively associated with the housing introduces the precursor powder material into the interior milling cavity. A feed gas inlet operatively associated with the powder feed inlet introduces a feed gas into the interior milling cavity. A product discharge outlet operatively associated with the housing removes a milled powder product from the interior milling cavity. An oil feed inlet operatively associated the housing introduces oil into the interior milling cavity.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
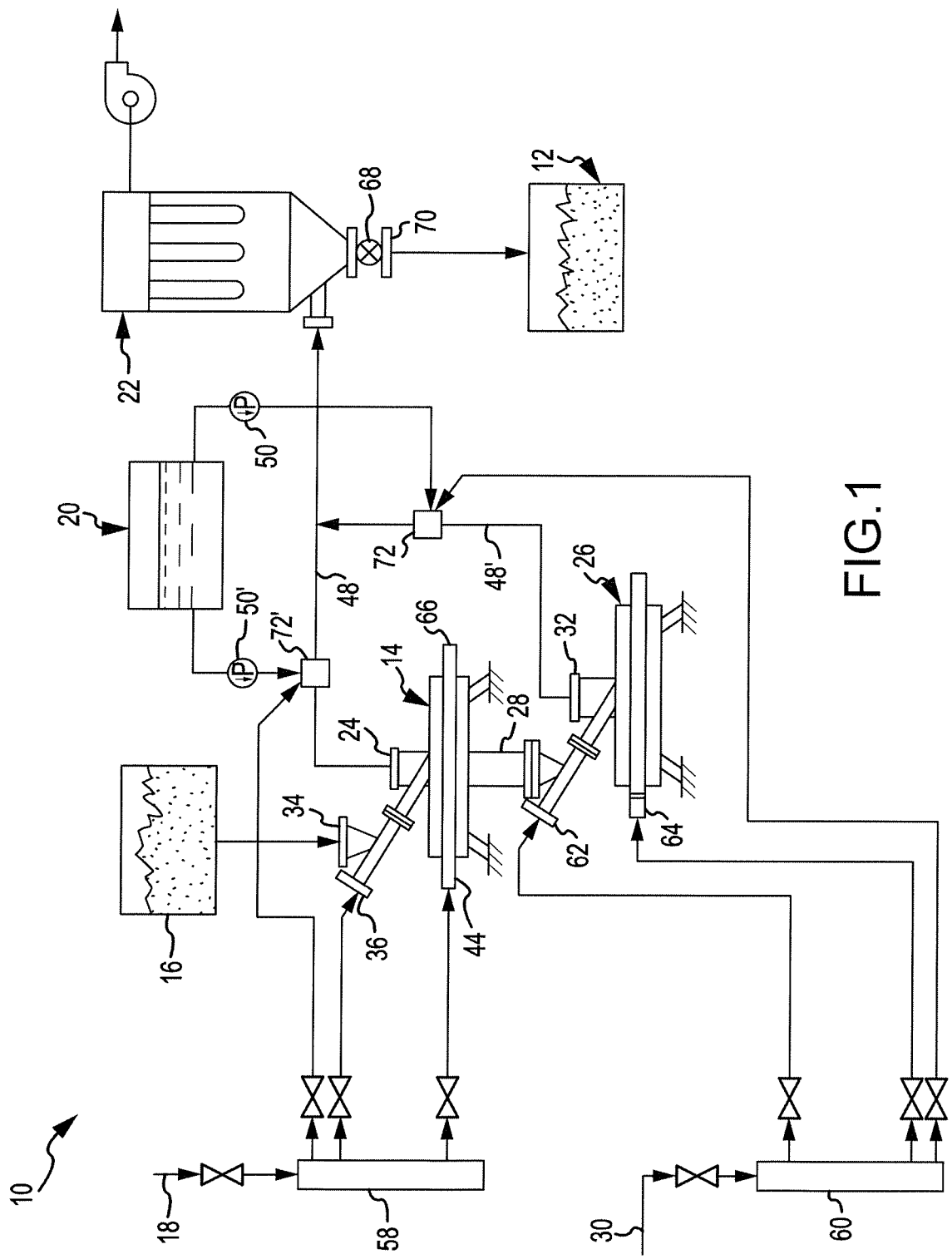
FIG. 1 is a schematic representation of various components and material pathways that may be utilized in one embodiment of the present invention to produce molybdenum disulfide particles.

Apparatus 10 for producing a molybdenum disulfide powder product 12 having a reduced acid number is illustrated in FIG. 1 and may comprise at least one fluid energy impact mill or "jet" mill 14 suitable for reducing the particle size of a molybdenum disulfide precursor powder material 16 via a fluid energy impact process. In one embodiment, jet mill 14 is operatively connected to a supply of pressurized process gas 18 that provides the energy required for the fluid energy impact process (i.e., particle size reduction). Process gas 18 also serves as a carrier medium for the various powder components (e.g., the final powder product 12 and powder precursor material 16) being processed by apparatus 10. A product collection apparatus 22 operatively connected to a discharge port or outlet 24 of jet mill 14 separates the powder product 12 from the "carrier" process gas 18.

Apparatus 10 may also comprise a supply of oil 20 that may be injected or combined with newly size-reduced particles at various points in the apparatus 10. For example, in the embodiment illustrated in FIG. 1, the oil 20 may be injected into the particle stream at one or more locations downstream from the jet mill 14. This type of oil injection may be referred to herein in the alternative as "post-milling oil injection." Alternatively, other embodiments may inject the oil 20 at one or more locations upstream from the mill 14 (referred to herein in the alternative as "pre-milling oil injection"). Still other embodiments may involve both pre- and post-milling oil injection. See FIG. 5.

The oil 20 is added to coat the newly-exposed surfaces of the size-reduced particles in order to reduce the acid number of the final powder product 12. In addition, in an embodiment involving pre-milling oil injection, such as that illustrated in FIG. 5, the oil 20 may also function to lubricate and/or cool the particles during the milling process. Pre-milling oil injection also allows the oil 20 to continuously coat the particles during the milling or size reduction process so that newly-exposed surfaces of the size-reduced particles are substantially continuously coated with oil 20 during the milling process. Post-milling oil injection coats the particles with oil immediately following the milling process, before they reach the product collection apparatus 22.

In some embodiments, the apparatus 10 may be provided with a second fluid energy impact or jet mill 26 to process additional quantities of the precursor powder material 16. See FIGS. 1 and 4. In such an embodiment, the second jet mill 26 may be operatively connected to a product "underflow" outlet 28 of first jet mill 14 so that the second jet mill 26 receives additional quantities of the precursor powder material 16 from the first mill 14. The second jet mill 26 may also be connected to a supply of pressurized process gas 30 which, in one embodiment, may be the same as the process gas supply 18 used for the first jet mill 14. See FIG. 1. A product discharge port 32 of second jet mill 26 is also operatively connected to product collection apparatus 22. In such an embodiment, then, the final powder product 12 will comprise a combination of milled powders from both the first mill 14 and the second mill 26. In an embodiment involving a second jet mill 26, it may be desirable or advantageous to inject oil 20 at one or more locations downstream from the second jet mill 26, as also shown in FIG. 1.

Figure 2:
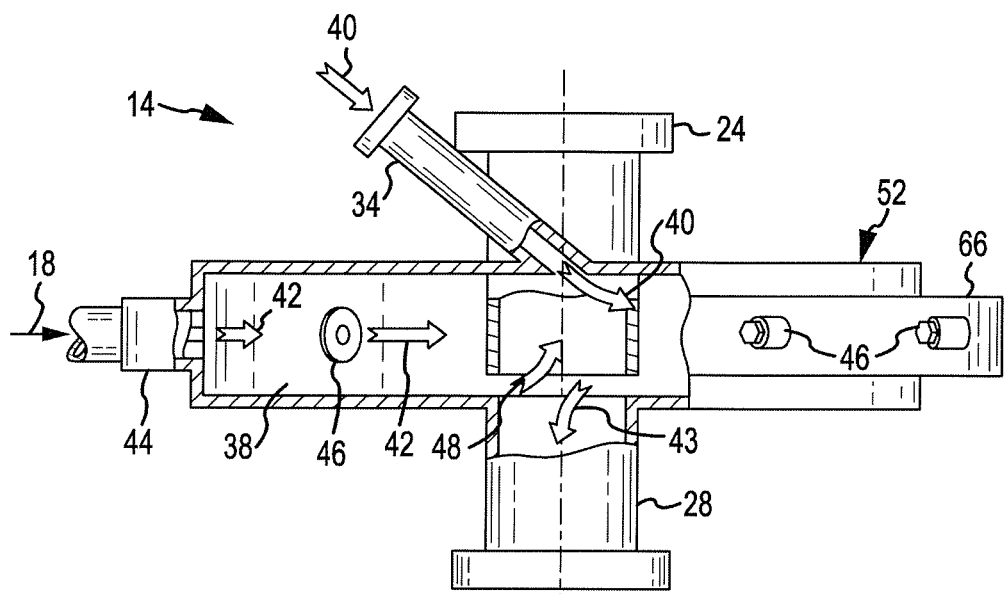
FIG. 2 is a side view in elevation of one embodiment of jet mill apparatus with a portion of the housing broken away to show the interior milling chamber.
Figure 3:
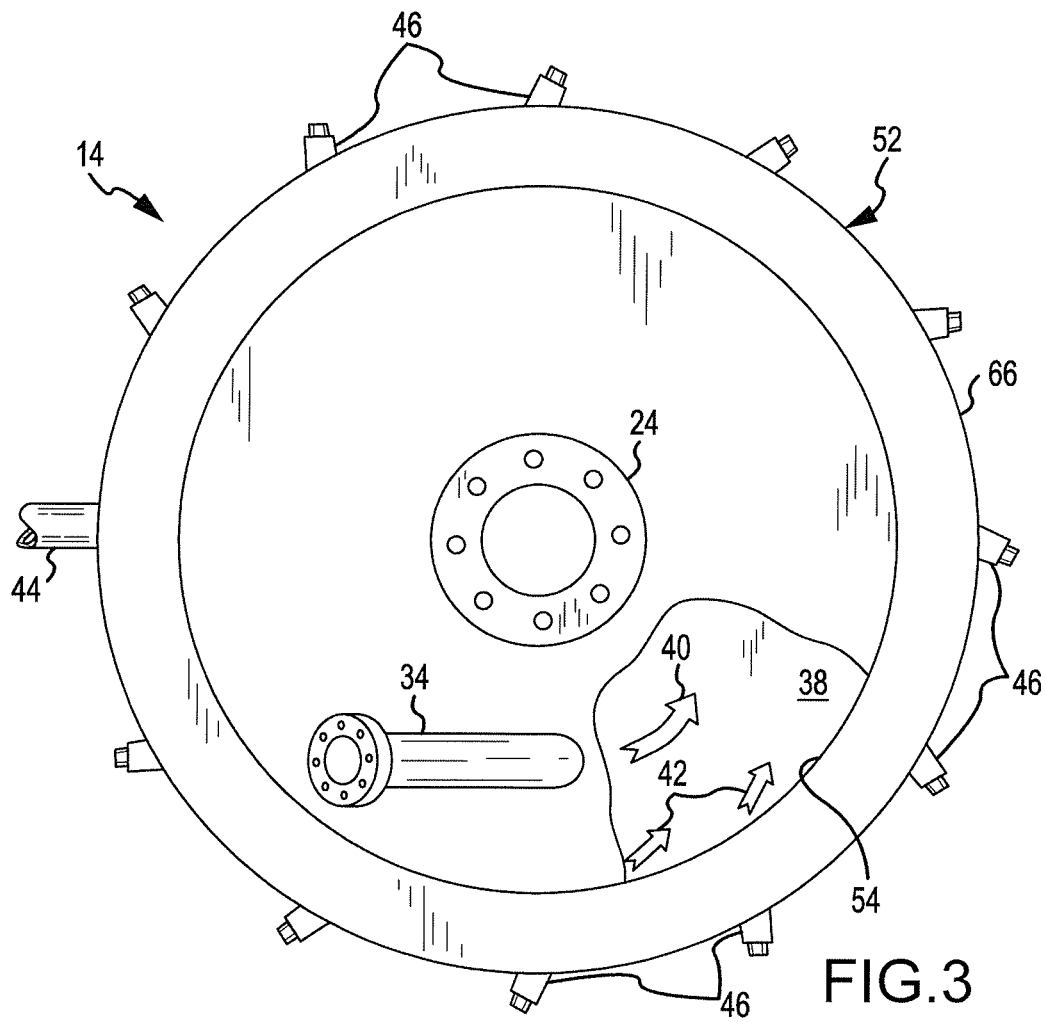
FIG. 3 is a top view of the jet mill illustrated in FIG. 2 with a portion of the housing broken away to show the interior milling chamber.

Referring now primarily to FIGS. 1-3, the apparatus 10 may be operated as follows to produce the molybdenum disulfide powder product 12 from the precursor powder material 16. A first step in the process may involve the provision of a suitable precursor material 16. In an embodiment wherein the final powder product 12 is to comprise a molybdenum disulfide ($MoS_2$) powder having a reduced acid number, the precursor powder material 16 may also comprise a molybdenum disulfide powder. However, the molybdenum disulfide precursor powder material 16 will typically comprise particles that are larger than the particles comprising the final powder product 12.

For example, in an embodiment wherein the final molybdenum disulfide powder product 12 is to comprise particles having sizes in the range typically associated with a superfine grade of molybdenum disulfide (e.g., particles having a median or "D50" particle size in a range of about 0.9 μm to about 1.6 μm), the molybdenum disulfide precursor powder material 16 may comprise particles in a range typically associated with a technical grade of molybdenum disulfide (e.g., particles having a median or D50 particle size in a range of about 16 μm to about 30 μm). Alternatively, of course, final powder products 12 and precursor materials 16 comprising other particle sizes may also be used with and/or made by the present invention, as would become apparent to persons having ordinary skill in the art after having become familiar with the teachings provided herein. Consequently, the present invention should not be regarded as limited to materials having any particular particle size or range of particle sizes. Also, and as will be described in further detail herein, in some embodiments, the precursor material 16 may be mixed with small quantities of oil in advance of milling.

The molybdenum disulfide precursor material 16 may be provided to first jet mill 14 via a powder feed inlet 34, as best seen in FIG. 1. In the particular embodiments shown and described herein, powder feed inlet 34 of jet mill 14 is also operatively associated with a feed gas inlet 36 that is connected to the supply of pressurized process gas 18. In such an arrangement, the precursor powder material 16 is combined with the process (or feed) gas 18 before being introduced into an interior milling cavity 38 of jet mill 14, as a particle-laden material feed stream 40. See FIGS. 2 and 3.

In the particular embodiment shown in FIG. 1, pressurized process gas 18 is also fed into jet mill 14 via a wall gas inlet 44. Wall gas inlet 44 carries or distributes the process gas 18 to a plurality of nozzles 46, each of which discharges the process gas 18 at high speed into the interior milling cavity 38 of jet mill 14 as a wall gas stream 42. See FIGS. 2 and 3.

As the particle-laden material feed stream 40 enters the interior milling cavity 38 it is rapidly accelerated to a high velocity by the wall gas stream 42 discharged by the various nozzles 46. The particles comprising the precursor material 16, which are now traveling at high speed, are ground or size-reduced in the interior milling cavity 38 of jet mill 14 by a process commonly referred to as fluid energy impact. In such a process, the particle size reduction is the result of high-velocity collisions among the particles of the precursor powder material 16 itself. No grinding media are involved. As this grinding or milling process continues, the size-reduced particles naturally migrate toward the centrally-located product discharge port 24 provided in the jet mill 14, whereupon they exit the jet mill 14 as particle-laden product stream 48. The particle-laden product stream 48 ultimately reaches the product collection apparatus 22, which separates the final powder product 12 from the carrier gas 18, as best seen in FIG. 1.

In the particular embodiment shown in FIG. 1 (i.e., comprising first and second jet mills 14 and 26 arranged in tandem), additional quantities of the precursor powder material 16, i.e., contained in the particle-laden material feed stream 40, are fed into the second jet mill 26 via the underflow outlet 28 provided in first jet mill 14. More specifically, the precursor material 16 contained in a product underflow stream 43 (FIG. 2) exiting the first jet mill 14 via the underflow outlet 28 is ground or size-reduced in the second mill 26 in substantially the same manner as in the first jet mill 14. The size-reduced particles exit the second jet mill 26 via the product discharge port 32 as particle-laden discharge stream 48'. The particle-laden discharge stream 48' from the second jet mill 26 may be combined with the particle-laden product stream 48 from the first mill 14 before reaching the product collection apparatus 22. Alternatively, the two discharge streams 48 and 48' need not be combined before reaching the product collection apparatus 22.

As briefly described above, in embodiments involving post-milling oil injection, oil 20 may be injected into the particle laden discharge stream 48 from the jet mill 14. If two jet mills are involved, oil 20 may be injected into the particle laden discharge streams 48 and 48' from either one or both jet mills 14 and 26. Whether oil 20 is injected into the particle-laden discharge streams 48 and 48' from either one or both jet mills 14 and 26 will depend on a wide range of factors, including the expected material flows from the jet mills, the amount of oil 20 to be injected in either stream, whether pre-milling oil injection is used, and whether any oil is combined with the precursor material 16 in advance of milling. Generally speaking the total amount of oil 20 (e.g., on a weight percentage basis) that may be added to the milled particles to achieve certain acid and oil number specifications may be about the same in any particular set-up. The total amount of added oil 20 may be divided among/between the various oil addition or injection points. Thus, embodiments involving pre-milling oil injection may involve reduced amounts of post-milling oil injection than might otherwise be the case. Similarly, if a majority of the milled particles is produced by the first jet mill 14, then most or all of the post-milling oil 20 may be injected into the particle laden discharge stream 48 from the first jet mill 14. Conversely, if a majority of the milled particles is produced by the second jet mill 26, then most or all of the post-milling oil 20 may be injected into the particle laden discharge stream 48' from the second jet mill 26. In still yet another variation, post-milling oil 20 may be injected into the particle-laden discharge streams 48 and 48' from both jet mills 14 and 26 in embodiments wherein both jet mills 14 and 26 produce about the same amount of milled particles.

After exiting the jet mill or mills 14, 26, after being combined with oil 20 (e.g., in post-oil injection embodiment), the particle-laden product stream(s) 48 and 48' from the mill(s) 14 and 26 may be directed to the product collection apparatus 22 which separates the final molybdenum disulfide powder product 12 from the process gas 18.

In one embodiment, the molybdenum disulfide powder product 12 may comprise a median or D50 particle size in a range of about 0.9 µm to about 1.6 µm with an acid number of less than about 0.5 mg KOH/g, and more typically less than about 0.3 mg KOH/g. Stated another way, the molybdenum disulfide powder product 12 of the present invention comprises a "superfine" grade (i.e., based on median particle size), but having an acid number that is considerably lower, by about an order of magnitude, compared with acid numbers typically associated with conventionally-available superfine molybdenum disulfide grades. However, the oil number of the molybdenum disulfide powder product 12 is about the same as the oil numbers of conventionally available superfine molybdenum disulfide grades.

A significant advantage of the present invention is that it provides a method and apparatus for producing a molybdenum disulfide powder product having an acid number that is considerably lower than the acid numbers of conventionally available powder materials of the same grade. For example, superfine grades of molybdenum disulfide powder product material 12 produced in accordance with the teachings of the present invention typically comprise an acid number of less than about 0.5 mg KOH/g (more typically less than about 0.3 mg KOH/g), which is considerably lower than the acid number associated with conventionally-available superfine grades of molybdenum disulfide, which is on the order of about 3 mg KOH/g. Moreover, the present invention achieves such a substantial reduction in acid number without a corresponding increase in the oil number of the final powder product.

As is known, the acid number represents the degree of surface oxidation of the molybdenum disulfide particles. The degree of oxidization, as measured by the acid number, is of considerable practical importance in the production and use of molybdenum disulfide. Characteristics and factors that are influenced by the oxidation behavior of molybdenum disulfide include, but are not limited to, product shelf life, corrosion factors (e.g., when in contact with other materials), film life, friction coefficient, gelling capabilities, and break-down temperature, to name a few.

Still other advantages are associated with the oil injection processes associated with the present invention. For example, in conventional molybdenum disulfide processing, oil is typically mixed with the molybdenum disulfide feed material before the material is ground in a jet mill. The mixing process typically involves feeding a defined quantity of molybdenum disulfide feed material and oil into a mixing drum or chamber. The oil and molybdenum disulfide are then mixed together in the drum for some defined period of time in order to ensure that the oil is thoroughly mixed with the molybdenum disulfide. After being mixed, the material is then fed into the jet mill for grinding.

This conventional process for producing a molybdenum disulfide powder product is less than optimal, in that it involves both batch and continuous processes in the same production line or sequence. The mixing of batch and continuous processes in a single production line is less than ideal in many respects and represents inefficiencies and sub-optimal use of materials and resources. In contrast with this conventional process, the present invention may dispense with the need to first coat the molybdenum disulfide precursor material with oil before it is fed into the jet mill, thereby eliminating the process steps, equipment, and time associated with the oil coating process.

Having briefly described basic embodiments of the invention, as well as several of its more significant features and advantages, various exemplary embodiments of methods and apparatus for producing the various powder products will now be described in detail. However, before proceeding with the description it should be noted that while the various embodiments are described herein as they could be used to produce a superfine grade of molybdenum disulfide (i.e., having a median or D50 particle size in the range of about 0.9 μm to about 1.6 μm) having an acid number of less than about 0.3 mg KOH/g, the methods and apparatus of the present invention could be used to produce a molybdenum disulfide powder product 12 having other particle sizes, commensurate with other commonly specified grades. Moreover, it should be noted that the present invention is not limited to the production of molybdenum disulfide powders, and could be used instead to produce other kinds of powders, and particularly coated particles, from other kinds of precursor and coating materials. Consequently, the present invention should not be regarded as limited to the particular products, materials, and applications shown and described herein.

Referring back now to FIGS. 1-3, one embodiment of apparatus 10 for producing a powder product 12, such as a superfine grade of molybdenum disulfide having a reduced acid number, may comprise a fluid energy impact mill or jet mill 14. Jet mill 14 may comprise a housing 52 that defines a generally circular interior milling chamber or cavity 38 therein that is bounded by a peripheral wall 54. Housing 52 of jet mill 14 may also be provided with a powder feed inlet 34 and a product discharge port 24 to allow the precursor material 16 to be fed into the jet mill 14 and to allow the powder product 12 to be extracted therefrom.

The powder feed inlet 34 is also operatively associated with feed gas inlet 36. This arrangement allows the precursor powder material 16 to be mixed or combined with the feed or process gas 18 to form particle-laden material feed stream 40. In addition, jet mill 14 may also be provided with a wall gas inlet 44. Wall gas inlet 44 allows a "wall" gas stream 42 (e.g., comprising process gas 18) to be injected into the interior milling chamber 38 from points adjacent the peripheral wall 54. In an embodiment wherein jet mill 14 is to be used in tandem with a second jet mill 26 (illustrated in FIGS. 1 and 4), the first jet mill 14 may also be provided with an internal cyclone collector (not shown) that is operatively associated with underflow outlet 28. Larger (i.e., oversized) particles collected by the cyclone collector (not shown) internal to the first jet mill 14 are discharged via underflow outlet 28 as underflow stream 43. See FIG. 2.

Referring now primarily to FIGS. 2 and 3, the peripheral wall 54 of jet mill 14 may also be provided with a plurality of nozzles 46. Each of the nozzles 46 is fluidically coupled with the wall gas inlet 44, e.g., via an annular plenum 66. Each of the nozzles 46 accelerates the "wall" gas (e.g., process gas 18) provided via the wall gas inlet 44, so that the wall gas stream 42 is discharged into the interior milling chamber 38 at high speed. The various nozzles 46 are angled with respect to the peripheral wall 54 so that the wall gas stream 42 is directed in a substantially tangential direction within milling chamber 38. See FIG. 3. The high speed wall gas stream 42 discharged by the nozzles 46 accelerates the precursor material 16 contained in the particle-laden material feed stream 40 a velocity sufficient to initiate the particle size reduction process.

Figure 4:
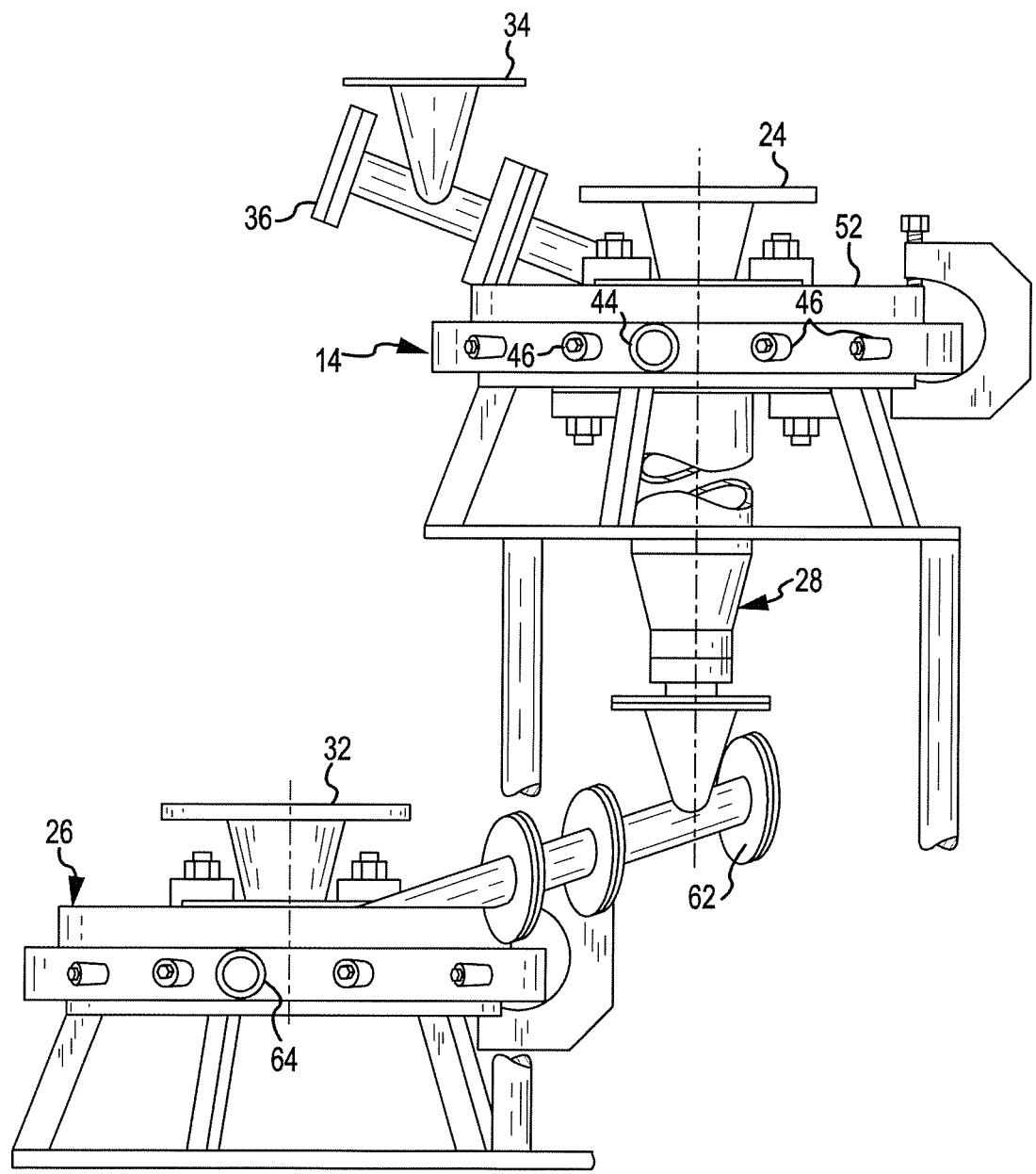
FIG. 4 is a side view in elevation of one embodiment of a tandem jet mill that may be used to produce molybdenum disulfide particles.

As mentioned, apparatus 10 may also comprise a second fluid energy impact or jet mill 26, as best seen in FIGS. 1 and 4. Second jet mill 26 may be used to process additional quantities of the precursor powder material 16 from the first jet mill 14. More specifically, the second jet mill 26 is operatively connected to the product underflow outlet 28 of first jet mill 14. Second jet mill 26 may also be connected to a supply of pressurized process gas 30 which, in one embodiment, may be the same as the process gas supply 18 used for the first jet mill 14. A product discharge port 32 of second jet mill 26 is also operatively connected to product collection apparatus 22. The second jet mill 26 may be substantially similar in construction to the first jet mill 14 already described. Consequently, the second jet mill 26 will not be described in further detail herein.

The first and second jet mills 14 and 26 may comprise any of a wide range of jet mill apparatus now known in the art or that may be developed in the future that are, or would be, suitable for effecting a particle size reduction via the fluid energy impact process described herein. Consequently, the present invention should not be regarded as limited to any particular jet mill apparatus having any particular configuration. However, by way of example, in one embodiment, the first and second jet mills 14 and 26 comprise a 15-inch tandem jet mill assembly available from the Jet Pulverizer Company of Moorestown, N.J. (US) under the trademark "Micron-Master." Alternatively, other types of jet mills available from other manufacturers may be used as well.

Referring back now to FIG. 1, jet mill 14 may be operatively connected to a supply of a precursor powder material 16. In an embodiment wherein the final powder product 12 is to comprise a molybdenum disulfide powder, the precursor powder material 16 may also comprise a molybdenum disulfide ($MoS_2$) powder. Molybdenum disulfide powders suitable for use in the present invention are commercially available from Climax Molybdenum Company, a Freeport-McMoRan Company, Ft. Madison Operations, Ft. Madison, Iowa (US). Alternatively, molybdenum disulfide powders available from other sources may be used as well. By way of example, the molybdenum disulfide precursor material 16 comprises a technical grade of molybdenum disulfide powder commercially available from Climax Molybdenum Company.

The pressurized process gas 18 provided to jet mill 14 provides the energy required for the fluid energy particle reduction process, and also serves as a carrier medium for the precursor powder material 16 and the final powder product 12. In an embodiment using a second jet mill 26, second jet mill 26 may be operatively connected to a supply of pressurized process gas 30, which may be the same as the supply of pressurized process gas 18 for the first jet mill 14. As was the case for the first jet mill 14, the pressurized process gas 30 for the second jet mill 26 provides the energy required for the milling process and also serves as a carrier medium for the various powders (e.g., the precursor powder material 16 and the final powder product 12) being processed by apparatus 10.

As depicted in FIG. 1, the pressurized process gas 18 may be provided to the feed gas and wall gas inlets 36 and 44 provided on jet mill 14 via a suitable distribution manifold 58. Alternatively, other arrangements are possible. In an embodiment using a second jet mill 26, the second jet mill 26 may also be connected to the supply of pressurized process gas 30 via a distribution manifold 60. Distribution manifold 60 is used to provide the pressurized process gas 30 to respective feed gas and wall gas inlets 62 and 64 of second jet mill 26, as also best seen in FIG. 1.

Process gases 18 and 30 may comprise any of a wide range of gases suitable for the intended application and for the particular materials involved. In one embodiment, pressurized process gases 18 and 30 comprise dry air and are provided at pressures and flow rates suitable for the particular jet mill or mills involved, as well as on various other factors, as would become apparent to persons having ordinary skill in the art after having become familiar with the teachings provided herein. Consequently, the present invention should not be regarded as limited to use with any particular type of process gases 18 and 30 and delivered at any particular pressure.

Apparatus 10 may also comprise a supply of oil 20 that may be provided or injected at any of a wide variety of locations or positions downstream or upstream from the jet mill(s) 14 and 26 in the manner described herein. In some embodiments, oil 20 may be injected at one or more locations downstream from the jet mill(s) 14 and 26 (i.e., in an embodiment involving post-mill oil injection), whereas in other embodiments, oil 20 may be injected at one or more positions upstream from the jet mill(s) 14 and 26 (i.e., in an embodiment involving pre-mill oil injection). In still other embodiments, the oil 20 may be injected at both upstream and downstream locations.

With reference now specifically to FIG. 1, in one embodiment, oil 20 may be injected into the particle laden product stream 48' from the second jet mill 24 by means of a nozzle assembly 72 that is operatively associated with the discharge conduit (not shown) connected to the product discharge port 32 of jet mill 26. A pump 50 may be used to provide the oil 20 at a pressure sufficient to allow the oil 20 to be sufficiently atomized by nozzle assembly 72 so that the oil 20 will evenly coat substantially all of the particles contained in the particle laden product stream 48'. Pump 50 may also include a metering device (not shown) suitable for regulating the flow of oil 20 into the process gas stream 18 in accordance with the teachings provided herein.

Nozzle assembly 72 may comprise any of a wide range of nozzles suitable for atomizing the oil 20 to a degree sufficient to provide a substantially even coating on the particles contained in the particle laden product stream 48'. By way of example, in one embodiment, nozzle assembly 72 may comprise an air atomizing nozzle in which a gas, such as air, is used to atomize the oil 20 entering nozzle assembly 72. If such an air atomizing nozzle is used, then nozzle assembly 72 will need to be connected to a suitable supply of air. In one embodiment, nozzle assembly 72 may be connected to the supply of process gas 30 via manifold 60, as best seen in FIG. 1, although other arrangements are possible.

It should be noted that nozzle assembly 72 need not comprise an air atomizing nozzle, but could comprise a high pressure or hydraulic nozzle in which the oil is provided at high pressure to the nozzle. If such a high pressure or hydraulic nozzle is used, then pump 50 should be capable of supplying the oil 20 at the high pressure required for satisfactory atomization.

As mentioned earlier, it may be desirable in certain embodiments of the invention to provide post-milling oil injection into the particle-laden product stream 48 from the first mill 14. Such an arrangement may be desirable or advantageous in embodiments wherein the first jet mill 14 produces substantial quantities of milled material or on other factors, as discussed herein. If so, additional quantities of oil 20 could be provided via a pump 50' and nozzle assembly 72' which may be identical to pump 50 and nozzle 72 already described for the first oil injection location. If nozzle assembly 72' comprises an air atomizing nozzle, then nozzle assembly 72' may be connected to the supply of pressurized process gas 18 via manifold 58, as best seen in FIG. 1. Alternatively, a high-pressure or hydraulic type nozzle could also be used, provided sufficient pressure is provided by pump 50'.

Oil 20 may comprise any of a wide range of oils that are now known in the art or that may be available in the future that are, or would be, suitable for the particular precursor material 16 being utilized. Consequently, the present invention should not be regarded as limited to any particular type of oil. However, by way of example, in one embodiment wherein the precursor material 16 comprises molybdenum disulfide, the oil 20 may comprise a paraffinic, low-viscosity oil containing polymethylmethacrylate (as a pour point depressant), a silicone anti-foaming additive, and a fatty-acid ester (as a friction modifier). Such an oil 20 is available from the American Refining Group as "Kendex LMO."

As already described, after being combined with oil 20 the particle-laden product stream(s) 48 discharged by jet mill 14 and, optionally, jet mill 26 (e.g., as particle-laden product stream 48'), are directed to a product collection apparatus 22. Product collection apparatus 22 operates to separate the (now oil-coated) final powder product 12 from the particle-laden stream 48. Product collection apparatus 22 may comprise any of a wide range of cyclone and/or "baghouse" type separator systems that are well-known in the art for such purposes and readily commercially available. Consequently, the particular product collection apparatus 22 that may be utilized in one embodiment of the present invention will not be described in further detail herein.

Apparatus 10 may be operated as follows to produce a powder product 12 from a precursor powder material 16. However, before proceeding with the description it should be noted that, because of the particle size reduction process performed by the jet mill(s) 14 and 26, it will be generally desirable to select a precursor powder material 16 having a particle size that is larger than that of the final powder product 12. However, the particle size of the precursor material 16 should not be so large as to preclude the production of a final powder product 12 having the desired particle size. That is, the particle size of the precursor material 16 should be selected so that the milling process will be successful in producing a final powder product 12 having the desired particle size. In addition, it should be noted that, in most applications, the precursor powder material 16 will generally comprise the same material as the final powder product 12. However, there may be circumstances where the two materials may comprise different substances.

By way of example, in an embodiment wherein the final powder product 12 is to comprise a molybdenum disulfide ($MoS_2$) powder, the precursor powder material 16 may also comprise a molybdenum disulfide powder. In the particular example embodiments described in the "Examples" section, wherein the molybdenum disulfide powder product 12 is to comprise particles having sizes in the range typically associated with a superfine grade of molybdenum disulfide (e.g., particles having a median or D50 particle size in a range of about 0.9 µm to about 1.6 µm), the molybdenum disulfide precursor powder material 16 may comprise particles in a range typically associated with a technical grade of molybdenum disulfide (e.g., particles having a median or D50 particle size in a range of about 16 µm to about 30 µm). In some embodiments, it may be desirable or advantageous to mix small amounts of oil with the precursor powder material 16 before the precursor material is fed to the jet mill 14.

The molybdenum disulfide precursor material 16 is provided to first jet mill 14 via a powder feed inlet 34, as best seen in FIG. 1. Because the powder feed inlet 34 of jet mill 14 is also operatively associated with the feed gas inlet 36, the precursor powder material 16 will be entrained in the process gas 18, thus forming a particle-laden material feed stream 40. The particle-laden material feed stream 40 then enters the interior milling chamber 38 of jet mill 14, as best seen in FIGS. 2 and 3. During this material feed process, additional amounts of process gas 18 are fed into the jet mill 14 via wall gas inlet 44, whereupon it enters the interior milling cavity 38 via the plurality of nozzles 46 as wall gas stream 42.

As the precursor powder material 16 enters the interior milling cavity 38 (i.e., suspended in the particle-laden material feed stream 40), the particles contained therein are accelerated to high velocities by the wall gas steam 42 exiting the nozzles 46. The velocity is sufficient to initiate the grinding or particle size reduction process. More particularly, as the particles of the precursor material 16 travel in a circular pattern in the interior milling chamber 38, they collide with one another and break apart. As the grinding or milling process continues, the size-reduced particles migrate toward the centrally-located product discharge port 24 provided in the jet mill 14, whereupon they exit jet mill 14 as particle-laden product stream 48.

In an embodiment comprising first and second jet mills 14 and 26 arranged in tandem, additional quantities of the precursor powder material 16, i.e., contained in product underflow stream 43, are fed into the second jet mill 26 via the underflow outlet 28. As described earlier, the product underflow stream 43 comprises a mixture of the particle-laden material feed stream 40 and the wall gas stream 42. The precursor material 16 contained in the underflow stream 43 is ground or size-reduced in the second mill 26 in substantially the same manner as in the first jet mill 14, and departs the second jet mill 26 via the product discharge port 32 as particle-laden discharge stream 48'.

Depending on the particular embodiment, either one or both of the particle-laden discharge stream(s) 48 and 48' (i.e., comprising newly size-reduced particles) are combined with oil 20 before arriving at the product collection apparatus 22. In an embodiment wherein the second jet mill 24 processes a majority of the material, then only the particle-laden discharge stream 48' from the second mill 24 may be combined with oil 20 from nozzle assembly 72. Alternatively, the particle-laden discharge stream 48 from the first mill 14 may also be combined with oil 20 from nozzle assembly 72'. In any event, and regardless of whether either one or both particle-laden product streams 48 and 48' are combined with oil 20, the streams 48 and 48' are then conducted to the product collection apparatus 22 which separates the final powder product 12 from the process gas 18.

The molybdenum disulfide powder product 12 produced by first and second jet mills 14 and 26 comprises a median or "D50" particle size in a range of about 0.9 µm to about 1.6 µm with an acid number of less than about 0.5 mg KOH/g, and more typically less than about 0.3 mg KOH/g. Particle size as measured by a Fisher Sub-Sieve Sizer (FSSS) is less than about 0.6 µm and more particularly in a range of from about 0.4 µm to about 0.45 µm, also with an acid number of less than about 0.5 mg KOH/g. The molybdenum disulfide powder product 12 thus comprises a particle size consistent with the superfine grade of molybdenum disulfide. However, unlike conventionally available superfine grades of molybdenum disulfide, the acid number of the molybdenum disulfide powder product 12 is generally considerably lower (e.g., by about an order of magnitude), compared to the acid numbers typically associated with conventionally-available superfine molybdenum disulfide grades. The oil number of the molybdenum disulfide powder product 12 is about the same as the oil numbers of conventionally available superfine molybdenum disulfide grades.

As mentioned earlier, other embodiments of the invention may be provided with pre-milling oil injection, in which the oil is provided or injected at one or more locations upstream from the jet mill(s). Still other embodiments may be provided with both pre-milling oil injection and post-milling oil injection. Moreover, an embodiment configured for both pre- and post-milling oil injection may be operated in either or both injection modes by selectively activating and deactivating the oil injection systems at the various locations.

Figure 5:
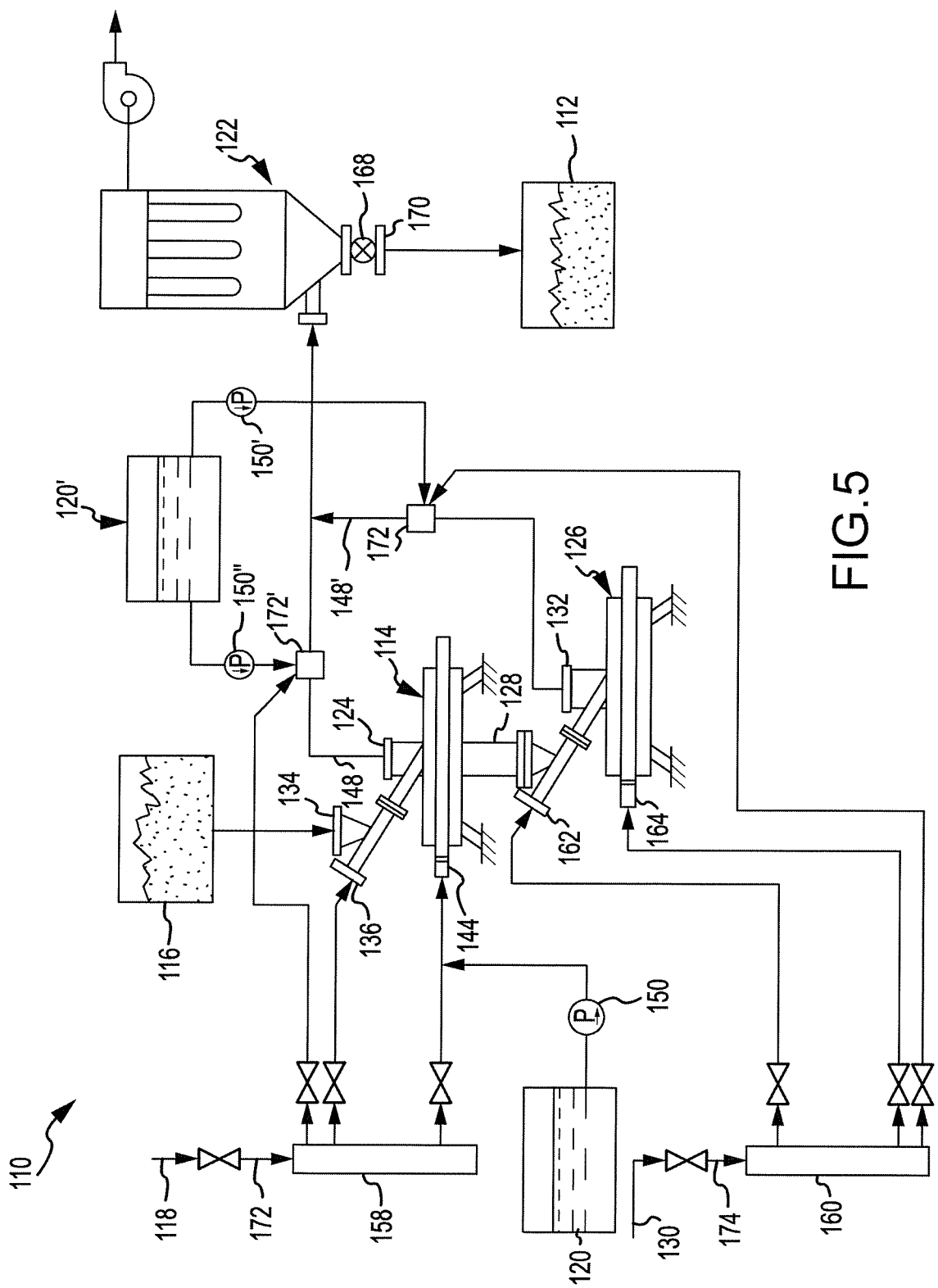
FIG. 5 is a schematic representation of various components and material pathways that may be utilized in another embodiment of the present invention to produce molybdenum disulfide particles.

For example, and with reference now primarily to FIG. 5, another embodiment 110 of the apparatus and method of the present invention may involve systems for providing both pre- and post-milling oil injection. Embodiment 110 may comprise a first jet mill 114 and a second jet mill 126 connected in tandem. As was the case for the embodiments already described, the first mill 114 of embodiment 110 may be operatively connected to a supply of pressurized process gas 118, whereas the second mill 126 may be operatively connected to a supply of pressurized process gas 130. The pressurized process gases 118 and 130 may comprise the same gas and may be provided by respective manifolds 158 and 160.

The jet mill 114 is also operatively connected to a supply of oil 120. The oil 120 provided to jet mill 114 provides the embodiment 110 with the pre-milling oil injection function or operational mode. The oil 120 functions to lubricate the particles during the milling process and also continuously coats the particles during the milling or size reduction process so that newly-exposed surfaces of the size-reduced particles are substantially continuously coated with oil during the milling process.

Generally speaking, it will be desirable to inject or provide the oil 120 to the jet mill 114 so that there will be almost immediate mixing of the oil 120 with the material being ground in the interior milling chamber or cavity (e.g., cavity 38 of FIGS. 2 and 3). Provision of the oil 120 at points too far "upstream" from the jet mill 114, such as, for example, at a location 172 on the upstream end of distribution manifold 158, may result in fouling of the manifold 158 and gas (i.e., air) lines with excess quantities of oil 120. Still further, it is generally desirable to mix the oil 120 with the "wall gas" (i.e., provided to the jet mill 114 via the wall gas inlet 144) as opposed to the "feed gas" (i.e., provided via the feed gas inlet 136). Mixing the oil 120 with the feed gas may result in fouling or clogging of the jet mill 114 with sludge-like deposits comprising the oil and the powder material being processed. If a second jet mill 126 is to be provided, it will also be desirable to provide the oil 120 to the first mill 114 in sufficient quantities so that there will be sufficient oil "carry-over" to the second jet mill 126 (i.e., as a component of underflow stream), thereby dispensing with the need to provide additional oil 120 to the second jet mill 126.

In accordance with the foregoing considerations, then, in one embodiment, the oil 120 is combined with the pressurized process gas 118 at about the location of the wall gas inlet 144 on the jet mill 114. The resulting oil-containing process gas stream will then enter the interior milling chamber of jet mill 114 via the wall gas nozzles in the manner already described for the first embodiment. A pump 150 may be used to provide the oil 120 at a pressure sufficient to allow it to be mixed with the pressurized process gas 118 flowing into the wall gas inlet 144. Pump 150 may also include a metering device (not shown) suitable for regulating the flow of oil 120 into the process gas stream 118 in accordance with the teachings provided herein.

Provision of the oil 120 in the manner described herein, i.e., at about the location of the wall gas inlet 144 of jet mill 114, provides good results, with no oil fouling of the air lines (e.g., carrying the pressurized process gas 118) or the interior milling chamber or cavity of jet mill 114. Still further, the underflow stream (e.g., exiting jet mill 114 via underflow outlet 128) contains sufficient "carry over" oil so that additional supplies of oil 120 did not need to be provided to the second mill 126.

The apparatus 110 may also be provided with post-milling oil injection system, thereby allowing the apparatus 110 to be operated in either the pre-milling oil injection mode, the post-milling oil injection mode, or both modes together. The post-milling oil injection system may be substantially identical to the system already described for the embodiment illustrated in FIG. 1 and may comprise a second oil supply 120', although first oil supply 120 could be used for this purpose as well. A first nozzle assembly 172 may be operatively associated with a discharge conduit (not shown) connected to the product discharge port 132 of second jet mill 126. First nozzle 172 will allow oil 120' to be combined with the particle-laden product stream 148' produced by the second mill 126. If desired, a second nozzle assembly 172' may be operatively associated with a discharge conduit (also not shown) connected to the product discharge port 124 of first jet mill 114. Respective pumps 150', 150" may be provided to supply the oil 120' to the nozzle assemblies 172, 172', as best seen in FIG. 5. Nozzle assemblies 172, 172' may also be connected to the pressurized process gas supplies 118 and 130 via respective manifolds 158, 160, in the manner already described for the embodiment 10 illustrated in FIG. 1. Embodiment 110 may also be provided with a product collection apparatus 122 for separating the powder product 112 from the carrier process gases 118, 130.

The apparatus 110 may be operated as follows to produce the molybdenum disulfide powder product 112 from a precursor powder material 116. The molybdenum disulfide precursor material 116 may be provided to the first jet mill 114 via a powder feed inlet 134, whereupon it will be entrained in the process gas 118 from the feed gas inlet 136.

During this material feed process, oil 120 is also provided to the jet mill 114 (i.e., in the pre-milling oil injection process), so that the fluid energy size reduction process occurring in the interior chamber of jet mill 114 is conducted in an oil-containing atmosphere. More specifically, the oil 120 is combined with the pressurized process gas 118 just before being fed into jet mill 114. The resulting oil-containing process gas stream enters the jet mill 114 via wall gas inlet 144, whereupon it enters the interior milling cavity via a plurality of nozzles (e.g., nozzles 46 shown in FIGS. 2 and 3).

As the precursor powder material 116 enters the interior milling cavity of jet mill 114, the particles thereof are accelerated to a high velocity by the oil-containing process gas steam exiting the nozzles. The velocity is sufficient to initiate the grinding or particle size reduction process. More particularly, as the particles of the precursor material 116 travel in a circular pattern in the interior milling chamber, they collide with one another and break apart. As they are reduced in size, the newly-exposed surfaces of the broken particles are rapidly coated with oil 120 suspended in the oil-containing process gas stream. The rapid coating of the newly-exposed surfaces of the particles minimizes the oxidation thereof, resulting in a significant reduction of the acid number of the molybdenum disulfide powder product 112.

As the grinding or milling process continues, the oil coated, size-reduced particles migrate toward the centrally-located product discharge port 124 provided in the jet mill 114, whereupon they exit jet mill 114 as particle-laden product stream 148. The particle-laden product stream 148 is then directed to the product collection apparatus 122 which separates the final powder product 112 from the carrier gas 118.

In an embodiment comprising first and second jet mills 114 and 126 arranged in tandem, as shown in FIG. 5, additional quantities of the precursor powder material 116 (i.e., contained in product underflow stream from mill 114) are fed into the second jet mill 126 via the underflow outlet 128 of first mill 114. The product underflow stream comprises a mixture of the particle-laden material feed stream and the oil-containing process gas stream. Sufficient oil 120 remains in the product underflow stream so that the particle size reduction process in the second jet mill 126 is also conducted in an oil-containing atmosphere. No additional oil 120 need be supplied to the second jet mill 126.

The precursor material 116 contained in the underflow stream from the first mill 114 is ground or size-reduced in the second mill 126 and departs the second jet mill 126 via the product discharge port 132 as particle-laden discharge stream 148'. The particle-laden discharge stream 148' from the second jet mill 126 is then directed to the product collection apparatus 122, which separates the final powder product 112 from the process gas 118.

Post-milling oil injection may be provided by activating one or both of the nozzle assemblies 172, 172' to combine additional amounts of oil 120' with the particle-laden product streams 148, 148' from the first and second mills 114, 126, respectively. Whether any such post-milling injection is performed and on which particle-laden product streams 148, 148' will depend on a wide variety of factors, many of which are described herein and others of which would become apparent to persons having ordinary skill in the art after having become familiar with the teachings provided herein.

EXAMPLES

Post-Milling Oil Injection

Two separate milling runs or trials, referred to herein as Trials 1 and 2, were conducted with milling apparatus substantially as shown in FIG. 1 and operating in the post-milling oil injection mode, wherein oil 20 was injected into the particle-laden product stream 48' from the second jet mill 26 (oil 20 was not injected into the particle-laden product stream 48 from the first jet mill 14). In the first trial, about 2268 kg (about 5000 lbs) of precursor material 16 was processed to yield approximately the same quantity of final powder product 12. The precursor powder material 16 was pre-oiled my mixing about 5.9 kg (about 13 lbs) of oil 20 with the precursor material 16 in advance of milling. Twenty four (24) separate samples of the powder product 12 from the first trial were collected from a collection port 70 located just below a rotary valve 68 associated with the product collection apparatus 22. See FIG. 1. Each of the samples was then analyzed for oil and acid numbers. The results of the analyses are set forth in Table I.

The second post-milling oil injection trial (i.e., Trial 2) was basically identical to the first trial (i.e., Trial 1), except that the amount of oil that was mixed with the precursor material 16 in advance of milling was reduced to about 4.5 kg (about 10 lbs), still with about 2268 kg (about 5000 lbs) of precursor material 16. Thirty nine (39) separate samples of the powder product 12 from the second trial were collected from the collection port 70. Each of the samples was then analyzed for oil and acid numbers. The results of the analyses are set forth in Table II.

The operational parameters for Trials 1 and 2 were basically identical, with the exception of the amount of oil that was added to the precursor powder material during the pre-oiling step (i.e., about 5.9 kg (about 13 lbs) for Trial 1 and about 4.5 kg (about 10 lbs) for Trial 2). The amount of oil 20 that was injected post milling was also increased from a range of about 0.14 kg/hr to about 0.18 kg/hr (about 0.3-0.4 lbs/hr) for Trial 1 to a range of about 0.18 kg/hr to about 0.23 kg/hr (about 0.4-0.5 lbs/hr) for Trial 2 to compensate for the reduced amount of oil used in the pre-oiling step.

The apparatus for both trials was also the same, and involved the use of a tandem, 15-inch jet mill of the type described herein as jet mills 14 and 26 and shown in FIG. 1. The precursor powder material 16 for both trials comprised a technical grade of molybdenum disulfide powder obtained from the Climax Molybdenum Company, Ft. Madison Operations, as specified herein. The molybdenum disulfide precursor powder material 16 had a median or D50 particle size in a range of about 16 µm to about 30 µm. The acid number specification for the precursor material was 0.05 mg KOH/g (maximum), whereas the oil number specification was 0.05 weight percent (maximum) (before any pre-oiling).

The feed rate of the powder precursor material 16 was controlled at about 64 kg/hr (about 140 lbs/hour). The oil 20 for both pre-oiling and post-mill oil injection comprised the Kendex LMO oil specified herein as was fed or metered into the apparatus 10 at a rate in a range of about 0.14 kg/hr to about 0.18 kg/hr (about 0.3-0.4 lbs/hour) for Trial 1. The oil feed rate was increased to a feed rate in a range of about 0.18 kg/hr to about 0.23 kg/hr (about 0.4-0.5 lbs/hr) to compensate for the reduced oil used in the pre-oiling step for the Trial 2 precursor material. For both trials, the oil 20 was injected into the particle-laden product stream 48' from the second jet mill 26. That is, no oil 20 was injected into the particle-laden product stream 48 from the first mill 14. The process gas 18, 30 was delivered to the feed inlets 36 and 62 of jet mills 14 and 26, respectively, at a pressure of about 0.62 MPa (about 90 pounds per square inch gauge, psig). The process gas 18, 30 was delivered to the wall gas inlets 44 and 64 of respective jet mills 14 and 26 at a pressure of about 0.59 MPa (about 85 psig).

For both trials, the median or D50 particle size of the molybdenum disulfide powder product 12 was in the range specified for the conventional superfine grade of molybdenum disulfide, i.e., in a range of about 0.9 µm to about 1.6 µm, with acid and oil numbers specified in Tables I and II.

TABLE I

Trial 1

| Sample Number | Oil No. (wt. %) | Acid No. (mg KOH/g) |
| --- | --- | --- |
| 1 | 0.206 | 0.729 |
| 2 | 0.198 | 0.598 |
| 3 | 0.457 | 0.897 |
| 4 | 0.382 | 0.561 |
| 5 | 0.274 | 0.373 |
| 6 | 0.257 | 0.467 |
| 7 | 0.204 | 0.523 |
| 8 | 0.297 | 0.317 |
| 9 | 0.334 | 0.168 |
| 10 | 0.330 | 0.224 |
| 11 | 0.427 | 0.201 |
| 12 | 0.342 | 0.224 |
| 13 | 0.322 | 0.112 |
| 14 | 0.311 | 0.392 |
| 15 | 0.383 | 0.130 |
| 16 | 0.402 | 0.280 |
| 17 | 0.216 | 0.430 |
| 18 | 0.119 | 0.542 |
| 19 | 0.300 | 0.243 |
| 20 | 0.379 | 0.149 |
| 21 | 0.270 | 0.261 |
| 22 | 0.417 | 0.261 |
| 23 | 0.399 | 0.336 |
| 24 | 0.682 | 0.243 |

TABLE II

Trial 2

| Sample Number | Oil No. (wt. %) | Acid No. (mg KOH/g) |
| --- | --- | --- |
| 1 | 0.55 | 0.01 |
| 2 | 0.12 | 0.24 |
| 3 | 0.65 | 0.16 |
| 4 | 1.70 | 0.11 |
| 5 | 3.62 | 0.26 |
| 6 | 0.19 | 1.30 |
| 7 | 0.04 | 0.86 |
| 8 | 0.03 | 1.26 |
| 9 | 0.58 | 0.20 |
| 10 | 1.82 | 0.06 |
| 11 | 0.92 | 0.02 |
| 12 | 0.18 | 0.20 |
| 13 | 0.58 | 0.01 |
| 14 | 1.04 | 0.41 |
| 15 | 0.70 | 0.47 |
| 16 | 0.33 | 0.33 |
| 17 | 0.35 | 0.31 |
| 18 | 0.29 | 0.16 |
| 19 | 0.21 | 0.20 |
| 20 | 0.96 | 0.15 |
| 21 | 1.02 | 0.30 |
| 22 | 1.01 | 0.13 |
| 23 | 0.28 | 0.21 |
| 24 | 0.33 | 0.18 |
| 25 | 0.16 | 0.01 |
| 26 | 0.22 | 0.09 |
| 27 | 0.24 | 0.16 |
| 28 | 0.20 | 0.11 |
| 29 | 0.26 | 0.08 |
| 30 | 0.36 | 0.21 |
| 31 | 0.31 | 0.31 |
| 32 | 0.27 | 0.07 |
| 33 | 0.41 | 0.12 |

TABLE II-continued

Trial 2

| Sample Number | Oil No. (wt. %) | Acid No. (mg KOH/g) |
|---|---|---|
| 34 | 0.28 | 0.22 |
| 35 | 0.18 | 0.26 |
| 36 | 0.83 | 0.10 |
| 37 | 0.82 | 0.15 |
| 38 | 0.32 | 0.15 |
| 39 | 0.20 | 0.29 |

As mentioned above, the particular samples referred to in Tables I and II were taken from the collection port 70 located just below the rotary valve 68 of the product collection apparatus 22. See FIG. 1. However, both Trials 1 and 2 involved the production of significant quantities of the molybdenum disulfide powder product 12. The powder product 12 from the respective trials was then loaded into drums, with each drum being filled with about 68 kg (about 150 lbs) of powder product material 12. Four of such drums were then loaded onto a pallet. The powder product 12 produced by Trial 1 resulted in two lots (i.e., Lot 1 and Lot 2) of thirty six (36) drums of material each. The powder product 12 from selected drums was then analyzed. The oil and acid numbers for each selected drum are presented in Table III for the Trial 1, Lot 1 material and Table IV for the Trial 1, Lot 2 material.

TABLE III

Trial 1, Lot 1

| Drum No. | Oil No. (wt. %) | Acid No. (mg KOH/g) |
|---|---|---|
| 4 | 0.30 | 0.24 |
| 8 | 0.25 | 0.15 |
| 12 | 0.27 | 0.35 |
| 16 | 0.25 | 0.35 |
| 20 | 0.29 | 0.24 |
| 24 | 0.28 | 0.94 |
| 28 | 0.30 | 0.48 |
| 32 | 0.34 | 0.33 |
| 36 | 0.34 | 0.49 |

TABLE IV

Trial 1, Lot 2

| Drum No. | Oil No. (wt. %) | Acid No. (mg KOH/g) |
|---|---|---|
| 4 | 0.36 | 0.35 |
| 8 | 0.28 | 0.39 |
| 12 | 0.29 | 0.21 |
| 16 | 0.25 | 0.32 |
| 20 | 0.38 | 0.43 |
| 24 | 0.37 | 0.40 |
| 28 | 0.34 | 0.74 |
| 32 | 0.41 | 0.53 |
| 36 | 0.36 | 0.55 |

The composited lot assay (i.e., an average of samples taken throughout the entire lot) of Lot 1 of Trial 1 was an oil number of 0.20 (wt. %) and an acid number of 0.45 (mg KOH/g). The composited lot assay of Lot 2 of Trial 1 was an oil number of 0.29 (wt. %) and an acid number of 0.25 (mg KOH/g). The powder product 12 produced by Trial 2 resulted in a total of three (3) lots, two lots (Lot 1 and Lot 2) of thirty three (33) drums of material each and one lot (Lot 3) of twenty five (25) drums. The powder product 12 from selected drums was then analyzed. The oil and acid numbers for each selected drum are presented in Table V for the Trial 2, Lot 1 material, Table VI for the Trial 2, Lot 2 material, and Table VII for the Trial 2, Lot 3 material.

TABLE V

Trial 2, Lot 1

| Drum No. | Oil No. (wt. %) | Acid No. (mg KOH/g) |
|---|---|---|
| 1 | 0.29 | 0.30 |
| 5 | 0.28 | 0.23 |
| 9 | 0.27 | 0.24 |
| 13 | 0.31 | 0.28 |
| 17 | 0.31 | 0.29 |
| 21 | 0.35 | 0.45 |
| 25 | 0.26 | 0.36 |
| 29 | 0.33 | 0.37 |
| 33 | 0.30 | 0.08 |

TABLE VI

Trial 2, Lot 2

| Drum No. | Oil No. (wt %) | Acid No. (mg KOH/g) |
|---|---|---|
| 1 | 0.25 | 0.17 |
| 5 | 0.27 | 0.14 |
| 9 | 0.32 | 0.16 |
| 13 | 0.16 | 0.06 |
| 17 | 0.24 | 0.05 |
| 21 | 0.31 | 0.14 |
| 25 | 0.27 | 0.17 |
| 29 | 0.29 | 0.19 |
| 33 | 0.30 | 0.17 |

TABLE VII

Trial 2, Lot 3

| Drum No. | Oil No. (wt. %) | Acid No. (mg KOH/g) |
|---|---|---|
| 1 | 0.30 | 0.03 |
| 5 | 0.33 | 0.05 |
| 9 | 0.32 | 0.04 |
| 13 | 0.30 | 0.09 |
| 17 | 0.38 | 0.22 |
| 21 | 0.36 | 0.02 |
| 25 | 0.35 | 0.02 |

The composited lot assay of Lot 1 of Trial 2 was an oil number of 0.32 (wt. %) and an acid number of 0.18 (mg KOH/g) for the lot. The composited lot assay of Lot 2 of Trial 2 was an oil number of 0.21 (wt. %) and an acid number of 0.36 (mg KOH/g) for the lot, whereas the composited lot assay of Lot 3 of Trial 2 was an oil number of 0.29 and an acid number of 0.20.

Pre-Milling Oil Injection:

Two separate milling runs or trials, referred to herein as Trials 3 and 4, were conducted with milling apparatus 110 substantially as shown in FIG. 5 and operating in the pre-milling oil injection mode, wherein oil 120 was injected into the apparatus 110 described below. In the third trial (i.e., Trial 3), about 1360 kg (about 3000 lbs) of precursor material 116 was processed to yield approximately the same quantity of final powder product 112. Nine (9) separate samples of the powder product 112 from the third trial were collected from a collection port 170 located just below a rotary valve 168 associated with the product collection apparatus 122. See FIG. 5. Each of the samples was then analyzed for oil and acid numbers. The results of the analyses are set forth in Table VIII.

While the third trial (i.e., Trial 3) produced an acceptable powder product 112, Trial 3 was not particularly successful from a processing standpoint in that the apparatus 110 was prone to excessive fouling with an oil/molybdenum disulfide "sludge." More specifically, in Trial 3, the oil 120 was added at "upstream" locations 172, 174 on respective process gas distribution manifolds 158 and 160, as best seen in FIG. 5. These particular oil injection locations resulted in excessive fouling and clogging of the distribution manifolds 158, 160 and jet mills 114, 126, with oil and sludge-like material. Further, the oil injection locations 172, 174 were such that oil 120 was delivered to both the feed gas streams (e.g., entering the mills 114 and 126 via respective feed gas inlets 136 and 162), as well as both wall gas streams (e.g., entering mills 114 and 126 via respective wall gas inlets 144 and 164).

The fourth trial (i.e., Trial 4) differed from the third trial (i.e., Trial 3), in that the oil 120 for Trial 4 was injected at about the wall gas inlet 144 of the first jet mill 114. See FIG. 5. No separate supply of oil 120 was provided to the second jet mill 126. The fourth trial was considerably more successful from a processing standpoint in that the apparatus 110 was substantially free from the clogging and fouling problems encountered in Trial 3. Fourteen (14) different samples of the powder product 112 produced by Trial 4 were also collected from collection port 170 and analyzed for oil and acid number, as set forth in Table IX. Corresponding specifications for the currently-available Climax superfine grade of molybdenum disulfide are also presented in Tables VIII and IX for comparison purposes.

The operational parameters for pre-mill oil injection Trials 3 and 4 were basically identical, with the exception of the oil injection locations, as noted above. The apparatus for both trials was also the same, and involved the use of a tandem, 15-inch jet mill of the type described herein as jet mills 114 and 126 and shown in FIG. 5. The precursor powder material 116 for both trials comprised a technical grade of molybdenum disulfide powder obtained from the Climax Molybdenum Company, Ft. Madison Operations, as specified herein. However, and unlike Trials 1 and 2, no pre-oiling of the precursor material was performed. The molybdenum disulfide precursor powder material 116 had a median or D50 particle size in a range of about 16 µm to about 30 µm. The acid number specification for the precursor material was 0.05 mg KOH/g (maximum), whereas the oil number specification was 0.05 weight percent (maximum).

The feed rate of the powder precursor material 116 was controlled at about 64 kg/hr (about 140 lbs/hour). The oil 120 comprised the Kendex LMO oil specified herein as was fed or metered into the apparatus 110 at a rate of about 0.3 kg/hr (about 0.7 lbs/hour). As noted above, in Trial 3, the oil 120 was injected at locations 172, 174, whereas in Trial 4, the oil 120 was injected at the wall gas inlet 144 of first mill 114. The process gas 118, 130 was delivered to the feed inlets 136 and 162 of jet mills 114 and 126, respectively, at a pressure of about 0.62 MPa (about 90 pounds per square inch gauge, psig). The process gas 118, 130 was delivered to the wall gas inlets 144 and 164 of respective jet mills 114 and 126 at a pressure of about 0.59 MPa (about 85 psig).

For Trials 3 and 4, the median or D50 particle size of the molybdenum disulfide powder product 112 was in the range specified for the conventional superfine grade of molybdenum disulfide, i.e., in a range of about 0.9 µm to about 1.6 µm, with acid and oil numbers specified in Tables VIII and IX.

TABLE VIII

Trial 3

| Sample Number | Oil (wt. %) | Acid No. (mg KOH/g) |
| --- | --- | --- |
| 1 | 0.42 | 0.03 |
| 2 | 0.37 | 0.03 |
| 3 | 0.24 | 0.16 |
| 4 | 0.22 | 0.15 |
| 5 | 0.22 | 0.14 |
| 6 | 0.21 | 0.18 |
| 7 | 0.2 | 0.11 |
| 8 | 0.22 | 0.12 |
| 9 | 0.29 | 0.28 |
| Climax Superfine | 0.40 (Max) | 3.0 (Max) |

TABLE IX

Trial 4

| Sample Number | Oil (wt. %) | Acid No. (mg KOH/g) |
| --- | --- | --- |
| 1 | 0.33 | 0.26 |
| 2 | 0.32 | 0.15 |
| 3 | 0.33 | 0.28 |
| 4 | 0.28 | 0.43 |
| 5 | 0.36 | 0.27 |
| 6 | 0.5 | 0.12 |
| 7 | 0.32 | 0.25 |
| 8 | 0.17 | 0.27 |
| 9 | 0.35 | 0.24 |
| 10 | 0.39 | 0.19 |
| 11 | 0.37 | 0.26 |
| 12 | 0.33 | 0.25 |
| 13 | 0.34 | 0.27 |
| 14 | 0.55 | 0.25 |
| Climax Superfine | 0.40 (Max.) | 3.0 (Max) |

The particular samples referred to in Tables VIII and IX were taken from the collection port 170 located just below the rotary valve 168 of the product collection apparatus 122. See FIG. 5. However, both Trials 3 and 4 also involved the production of significant quantities of the molybdenum disulfide powder product 112. The powder product 112 was loaded into drums, with each drum being filled with about 68 kg (about 150 lbs) of powder product material 112. Four of such drums were then loaded onto a pallet. The powder product 112 produced by Trial 3 resulted in twenty (20) drums of material loaded onto five (5) pallets, whereas the powder product 112 produced by Trial 4 was loaded into 32 drums for a total of 8 pallets. The powder product 112 from each of the drums was then analyzed. The average oil and acid numbers for each pallet are presented in Table X for the Trial 3 material and Table XI for the Trial 4 material.

TABLE X

Trial 3

| Pallet | Oil (wt. %) | Acid No. (mg KOH/g) |
| --- | --- | --- |
| 1 | 0.34 | 0.18 |
| 2 | 0.29 | 0.22 |
| 3 | 0.33 | 0.41 |
| 4 | 0.29 | 0.31 |
| 5 | 0.33 | 0.34 |

TABLE XI

Trial 4

| Pallet | Oil (wt. %) | Acid No. (mg KOH/g) |
|---|---|---|
| 1 | 0.37 | 0.34 |
| 2 | 0.35 | 0.32 |
| 3 | 0.39 | 0.34 |
| 4 | 0.32 | 0.28 |
| 5 | 0.37 | 0.34 |
| 6 | 0.27 | 0.27 |
| 7 | 0.31 | 0.28 |
| 8 | 0.39 | 0.39 |

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. Apparatus for reducing a particle size of a precursor powder material by fluid energy impact, comprising:
   a housing defining an interior milling cavity therein having a peripheral wall;
   a powder feed inlet operatively associated with said housing, said powder feed inlet allowing the precursor powder material to be introduced into the interior milling cavity;
   a feed gas inlet operatively associated with said powder feed inlet, said feed gas inlet allowing a feed gas to be introduced into the interior milling cavity;
   a product discharge outlet operatively associated with said housing, said product discharge outlet allowing a milled powder product to be removed from the interior milling cavity; and
   an oil injection nozzle assembly operatively associated with said product discharge outlet, said oil injection nozzle injecting oil into a particle-laden product stream from said product discharge outlet.

2. The apparatus of claim 1, further comprising:
   a wall gas inlet operatively associated with said housing, said wall gas inlet allowing a wall gas to be introduced into the interior milling cavity from a location adjacent the peripheral wall of the interior milling cavity; and
   an oil feed inlet operatively associated with said wall gas inlet, so that the oil is introduced into the interior milling cavity along with the wall gas.

3. The apparatus of claim 1, further comprising an underflow outlet operatively associated with said housing, said underflow outlet allowing precursor powder material to be removed from the interior milling cavity.

4. The apparatus of claim 3, further comprising:
   a second housing defining an interior milling cavity therein having a peripheral wall;
   a powder feed inlet operatively associated with said second housing, said powder feed inlet being operatively connected to said underflow outlet to allow the precursor powder material to be introduced into the interior milling cavity of said second housing; and
   a product discharge outlet operatively associated with said second housing, said product discharge outlet allowing a milled powder product to be removed from the interior milling cavity of said second housing, wherein said oil injection nozzle assembly is operatively associated with said product discharge outlet of said second housing.

5. Apparatus for reducing a particle size of a precursor powder material by fluid energy impact, comprising:
   a housing defining an interior milling cavity therein having a peripheral wall;
   a powder feed inlet operatively associated with said housing, said powder feed inlet allowing the precursor powder material to be introduced into the interior milling cavity;
   a feed gas inlet operatively associated with said powder feed inlet, said feed gas inlet allowing a feed gas to be introduced into the interior milling cavity;
   a product discharge outlet operatively associated with said housing, said product discharge outlet allowing a milled powder product to be removed from the interior milling cavity; and
   an oil feed inlet operatively associated with said housing, said oil feed inlet allowing an oil to be introduced into the interior milling cavity, said oil feed inlet being positioned with respect to the interior milling cavity of said housing so that there will be substantially immediate mixing of the oil with the precursor powder material being ground in the interior milling cavity.

6. The apparatus of claim 5, further comprising a wall gas inlet operatively associated with said housing, said wall gas inlet allowing a wall gas to be introduced into the interior milling cavity from a location adjacent the peripheral wall of the interior milling cavity and wherein said oil feed inlet is operatively associated with said wall gas inlet, so that the oil is introduced into the interior milling cavity along with the wall gas.

7. The apparatus of claim 5, further comprising an underflow outlet operatively associated with said housing, said underflow outlet allowing precursor powder material to be removed from the interior milling cavity.

8. The apparatus of claim 7, further comprising:
   a second housing defining an interior milling cavity therein having a peripheral wall;
   a powder feed inlet operatively associated with said second housing, said powder feed inlet being operatively connected to said underflow outlet to allow the precursor powder material to be introduced into the interior milling cavity of said second housing;
   a feed gas inlet operatively associated with said powder feed inlet of said second housing, said feed gas inlet allowing a feed gas to be introduced into the interior milling cavity of said second housing;
   a product discharge outlet operatively associated with said second housing, said product discharge outlet allowing a milled powder product to be removed from the interior milling cavity of said second housing; and
   an oil injection nozzle assembly operatively associated with said product discharge outlet of said second housing, said oil injection nozzle injecting oil into a particle-laden product stream from said product discharge outlet of said second housing.

* * * * *